(12) United States Patent
Moreth

(10) Patent No.: US 6,405,640 B1
(45) Date of Patent: Jun. 18, 2002

(54) ROASTING OVEN

(75) Inventor: R. Edward Moreth, Fort Lauderdale, FL (US)

(73) Assignee: Remco Technologies, Inc., Fort Lauderdale, FL (US)

( * ) Notice: Subject to any disclaimer, the term of this patent is extended or adjusted under 35 U.S.C. 154(b) by 0 days.

(21) Appl. No.: 09/850,012

(22) Filed: May 7, 2001

(51) Int. Cl.[7] .......................... A47J 37/00; A47J 37/04; A23L 1/00
(52) U.S. Cl. .............................. 99/334; 99/340; 99/401; 99/421 H; 99/427; 99/448; 99/450; 99/451; 99/DIG. 14
(58) Field of Search ........................... 99/327–334, 339, 99/340, 400, 401, 419–421 V, 426, 427, 444–450, 451, DIG. 14; 126/25 R, 9 R, 41 R; 219/400, 401, 386

(56) References Cited

U.S. PATENT DOCUMENTS

| | | | | |
|---|---|---|---|---|
| 1,263,331 A | * | 4/1918 | Lindroth | 99/446 |
| 2,618,730 A | * | 11/1952 | Panken | 99/421 H |
| 2,696,163 A | * | 12/1954 | Galley | 99/421 H |
| 2,762,293 A | * | 7/1956 | Boyajian | 99/421 P |
| 2,885,950 A | * | 5/1959 | Stoll et al. | 99/421 H |
| 3,104,605 A | * | 9/1963 | McKinney | 99/421 H |
| 3,125,015 A | * | 3/1964 | Schlaegel | 99/421 P |
| 3,196,776 A | * | 7/1965 | Norton | 99/421 P |
| 4,214,516 A | * | 7/1980 | Friedl et al. | 99/327 X |
| 4,321,857 A | * | 3/1982 | Best | 99/340 |
| 5,184,540 A | * | 2/1993 | Riccio | 99/421 H |
| 5,373,777 A | * | 12/1994 | Foster | 126/25 R |
| 5,560,285 A | * | 10/1996 | Moreth | 99/421 H |

* cited by examiner

Primary Examiner—Timothy F. Simone
(74) Attorney, Agent, or Firm—M. K. Silverman

(57) ABSTRACT

A roasting oven system includes elongate food holding wire mesh baskets, each having an axis of rotation defined by a left and right axial device secured to respective end walls of the baskets. The system also includes a housing having respective upper, lower, front, back, left end, and right end walls defining, in combination, a hollow interior envelope having a substantially concave upper surface, the housing including, within at least one of the front or rear walls, a movable panel for selectably removing and inserting the elongate baskets into the housing and upon a journal device within end plates at each opposite end wall. At least one of the front or rear walls further includes a narrow opening to provide a continuous and uninterrupted communication between the hollow interior envelope and the atmosphere. An infrared radiation element is situated within the envelope of housing, in which thereof is directed toward a center of the interior envelope of the oven. An axle and motor enables the passing of food products within the baskets through an arc or rotation and thereby into a zone of intensified temperature generally defined by the concave upper surface of the housing.

11 Claims, 6 Drawing Sheets

ROASTING OVEN

BACKGROUND OF THE INVENTION

1. Field of the Invention

This invention relates to an infrared roasting oven and, more particularly, to an apparatus, system and process for cooking food items, particularly meats.

2. Description of the Prior Art

This application is directed to an improvement of my U.S. Pat. Nos. 5,373,777 and 5,560,285, both entitled Roasting Oven. The instant invention more particularly relates to an infrared roasting oven particularly adapted for the rapid cooking of small pieces of food, particularly, meats having a weight of approximately fifty grams, including for example chicken wings. The instant invention also differs from all known prior art in that the food to be cooked is tossed and tumbled as opposed to skewered, during the cooking process. As such, the food, while exposed to high intensity infrared elements, is contained within the metal grill like baskets and the system axis rotates said wire-mesh baskets.

Other prior art, as known to the within inventor, includes U.S. Pat. No. 5,184,540 (1993) to Riccio, entitled Cooking Apparatus with Rotisserie. The teaching thereof is essentially that of a rotisserie oven in which the spit rotates at a greater rate than the drive member thereof. Riccio also employs a reclamation trap located between the spit to recover juices produced during the cooking of food therein.

The prior art is also represented by U.S. Pat. No. 4,321,857 (1982) to Best, entitled Infrared Gas Grill, the teaching of which relates to a grill assembly primarily in the nature of a smoking system. Best differs from the instant invention in that it employs a process of open cooking, that is, a grill-type system. As such, Best relies solely upon convection of heat for the cooking process, whereas the present invention, as is more fully set forth below, employs a combination of convective and radiant infrared energy, and a narrow window of continuous atmospheric communication, for effective function thereof.

Other art includes U.S. Pat. No. 4,214,516 (1980) to Friedl, entitled Barbecue Oven, this oven commercially known as the Hart Rotisserie. This structure does not employ a heat chamber notwithstanding its use of infrared burners therein. The system of Friedl exhausts gas and heat through a flue, this in distinction to the within inventive structure which circulates high BTU value air within a cooking envelope but does not positively discharge heated air to the atmosphere. Further, Freidl does not employ compressive high temperatures within an extreme heat chamber at the top of the cooking chamber, thereby creating cooking zones, that is, high temperature versus lower temperature but high thermal value cooking regions are not present in the structure or function of Freidl. cl SUMMARY OF THE INVENTION The present roasting oven system includes a plurality of elongate food holding wire mesh baskets, each having an axis of rotation defined by left and right axial means secured to respective end walls of the baskets. The system also includes a housing having respective upper, lower, front, back, left end, and right end walls defining, in combination, a hollow interior envelope having a substantially concave upper surface thereof, said housing including, within at least one of said front or rear walls thereof, a movable panel for selectably removing and inserting said elongate baskets into said housing and upon journal means within end plates at each opposite end wall of said housing At least one of said front or rear walls further includes a narrow opening to thereby provide a continuous and uninterrupted communication between said hollow interior envelope and the atmosphere. The system also includes at least one elongate infrared radiation element situated within said envelope of said housing, in which radiation thereof is directed generally toward a center of the interior envelope of said oven. Yet further included is a system axle journalled between said housing end walls, located proximally to said center of said walls, and also positioned between one and two basket diameters from said infrared radiation element, in which said axle is rigidly secured to said end plates upon which said baskets are journalled. A drive means is coupled to said system axle for effecting rotational movement of said end plates and said baskets journalled therein. Said drive means enables the passing of food products within said baskets through an arc or rotation and thereby into a zone of intensified temperature generally defined by said substantially concave upper surface of said housing.

It is an object of the invention to provide an infrared roasting oven, having zones of high, intermediate, and lower temperature, while employing a high thermal value internal atmosphere.

It is another object to provide an infrared roasting oven particularly adapted for the quick cooking of small pieces of foods, such as chicken wings, and cubes of meats.

It is a still further object of the invention to provide an infrared roasting oven which relies upon a balance of duration of exposure of the food to high infrared, high temperature radiant energy and exposure to high thermal value, but lower temperature, ambient heating to thereby achieve quick food cooking without loss of the natural taste and juices thereof.

It is a still further object to provide an infrared roasting oven of the above type, which continually tumbles the food to be cooked while providing continuous atmospheric communication and, thereby, cooked food, which retains a high degree of tenderness without loss of flavor or moisture otherwise associated with rapid cooking processes.

The above and yet other objects and advantages of the present invention will become apparent from the hereinafter set forth Brief Description of the Drawings, Detailed Description of the Invention, and Claims appended herewith.

DETAILED DESCRIPTION OF THE DRAWINGS

DETAILED DESCRIPTION OF THE INVENTION

Figure 1:
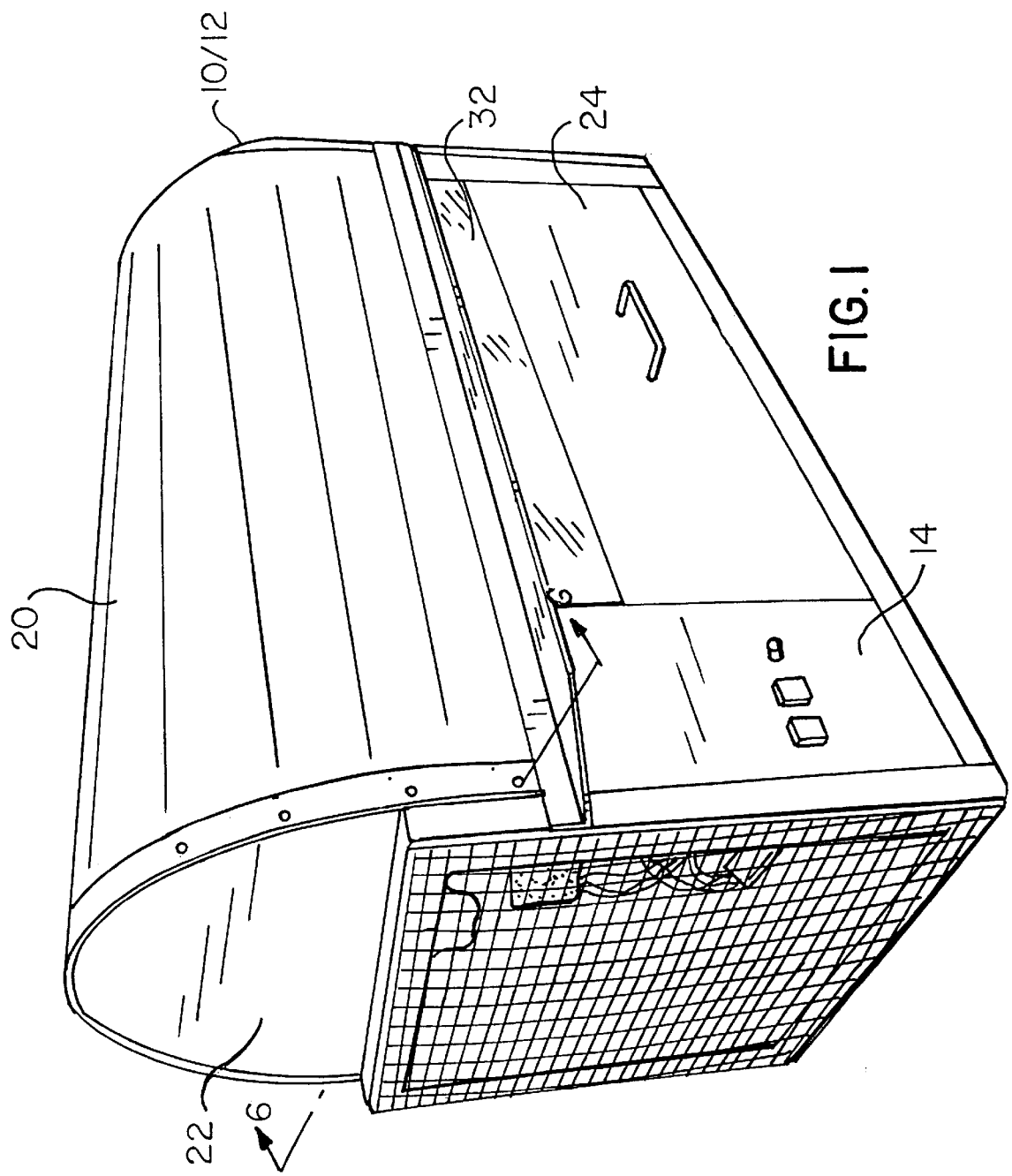
FIG. 1 is an external perspective view of the inventive system.
Figure 3:
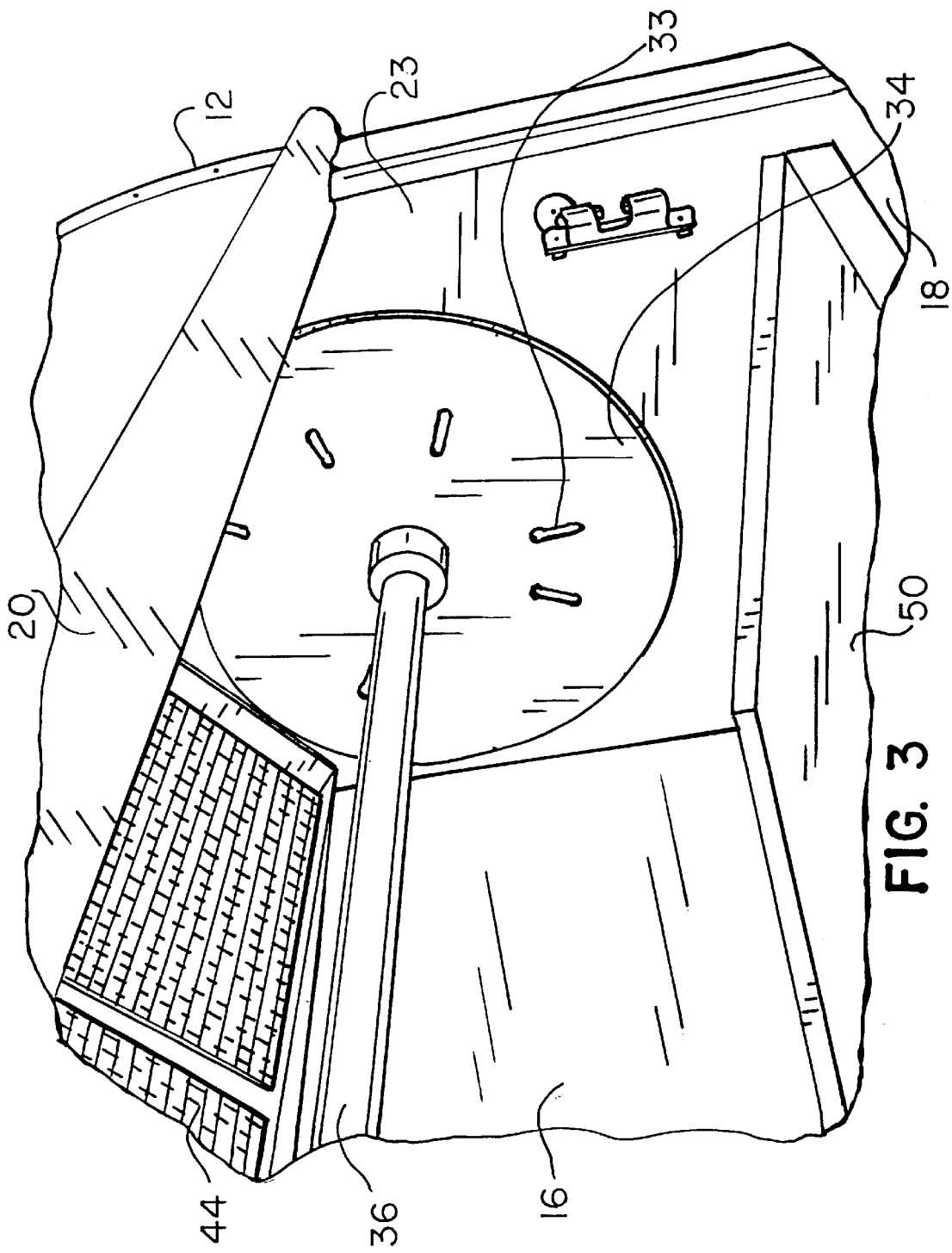
FIG. 3 is a breakaway internal view of the hollow interior envelope of the roasting oven showing the radiant elements, the system axle, and basket axle journalled plates.
Figure 6:
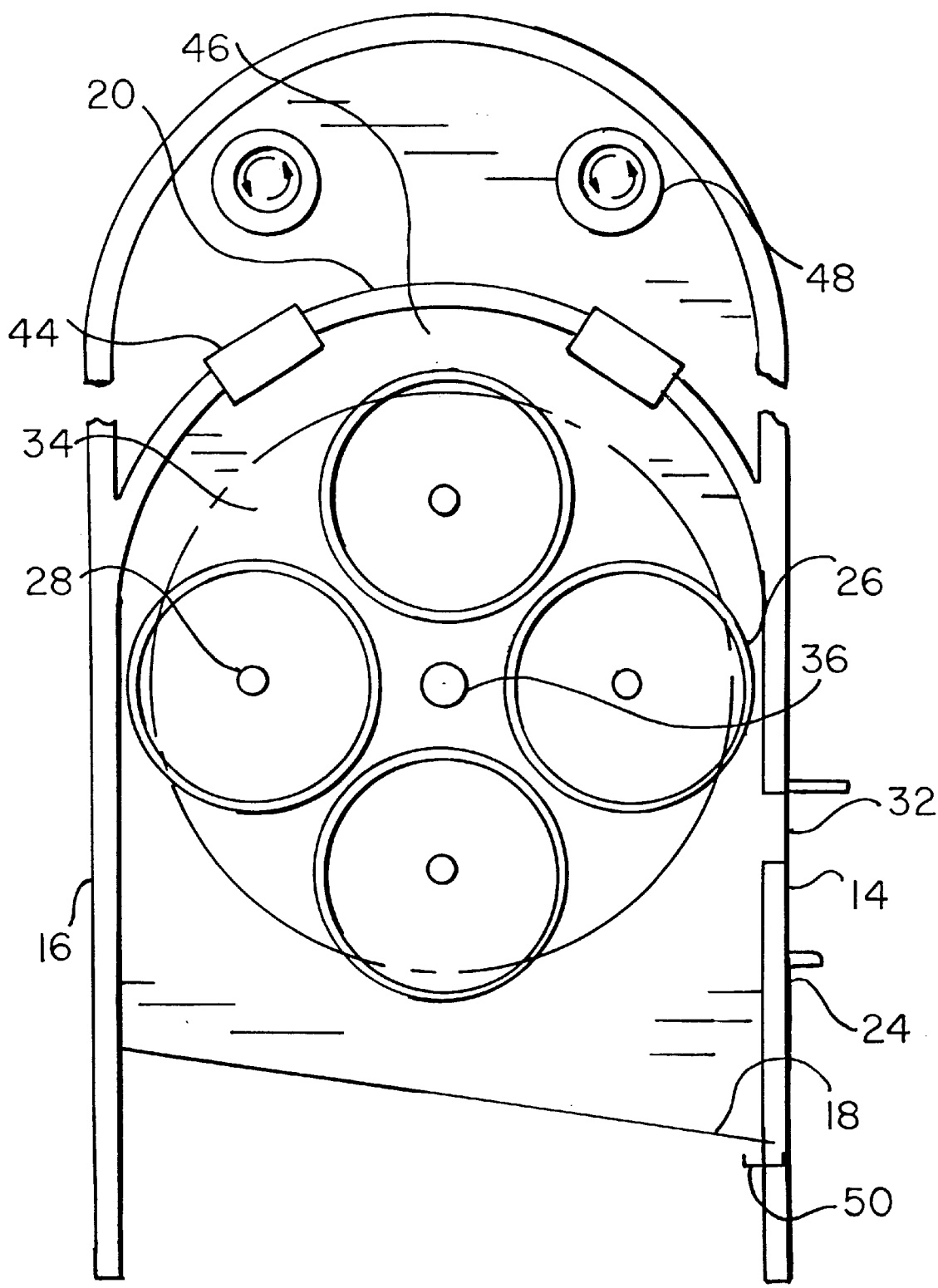
FIG. 6 is a radial cross-sectional view of the inventive system seen along Line 6—6 of FIG. 1.

With reference to the exterior perspective view of FIG. 1, a roasting oven 10 may be seen to include a housing 12 having a front wall 14, rear wall 16, bottom surface 18, and a concave upper surface 20 thereof. See also FIG. 6. The housing further includes left and right end walls 22 and 23 respectively. See FIGS. 1 and 3. Said walls define, in combination, a hollow interior envelope including said substantially concave upper surface 20 thereof.

Figure 5:
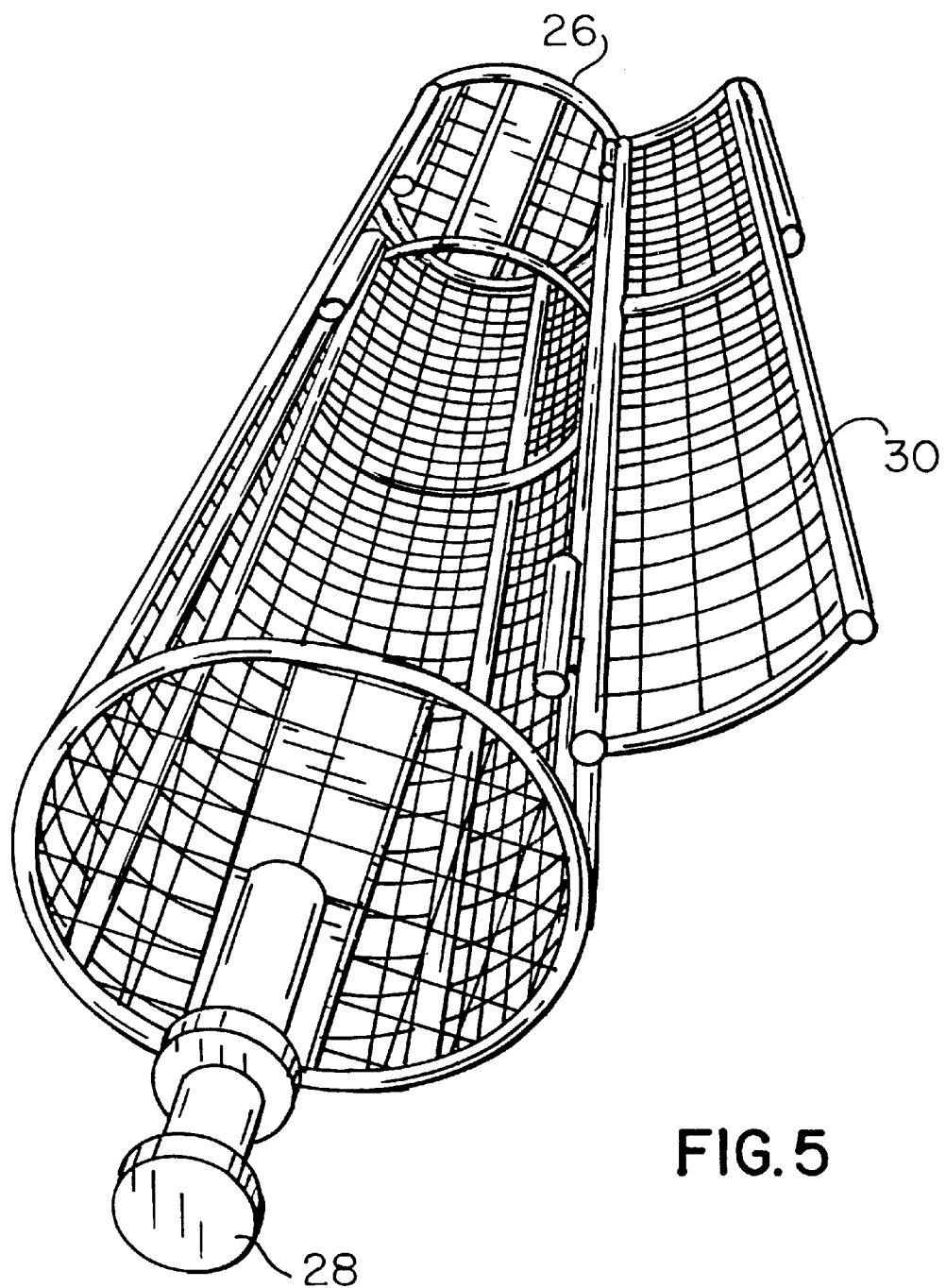
FIG. 5 is a perspective view of the cooking baskets used with the present invention.

Within a part of front wall 14 is shown a pivoted panel or door 24 for the selectable removal or insertion of a plurality of elongate food-holding wire-mesh baskets 26 (see FIGS. 5 and 6), each having an axis of rotation which is co-linear with externally secured left and right axle means 28 thereof. As may be noted in FIG. 5, there is provided a securable door 30 for each wire-mesh basket 26. Such baskets will typically exhibit a radius in a range of four to six centimeters and may be made of a Number 2 mesh stainless steel wire. These baskets will typically hold meat pieces of about 50 grams each that will tumble within each basket as rotation occurs. Further provided, preferably near to said pivoted panel 24 is an elongate preferably horizontal opening 32, having a height of about 3 to 4 cm, which provides for a continuous and uninterrupted fluid communication between the hollow interior envelope of housing 12 and the external atmosphere. The provision of such interrupted communication between the oven interior and the external atmosphere has been found to constitute a material aspect of the high degree of tenderness without loss of flavor or moisture of food resultant from the below-described roasting process.

Figure 2:
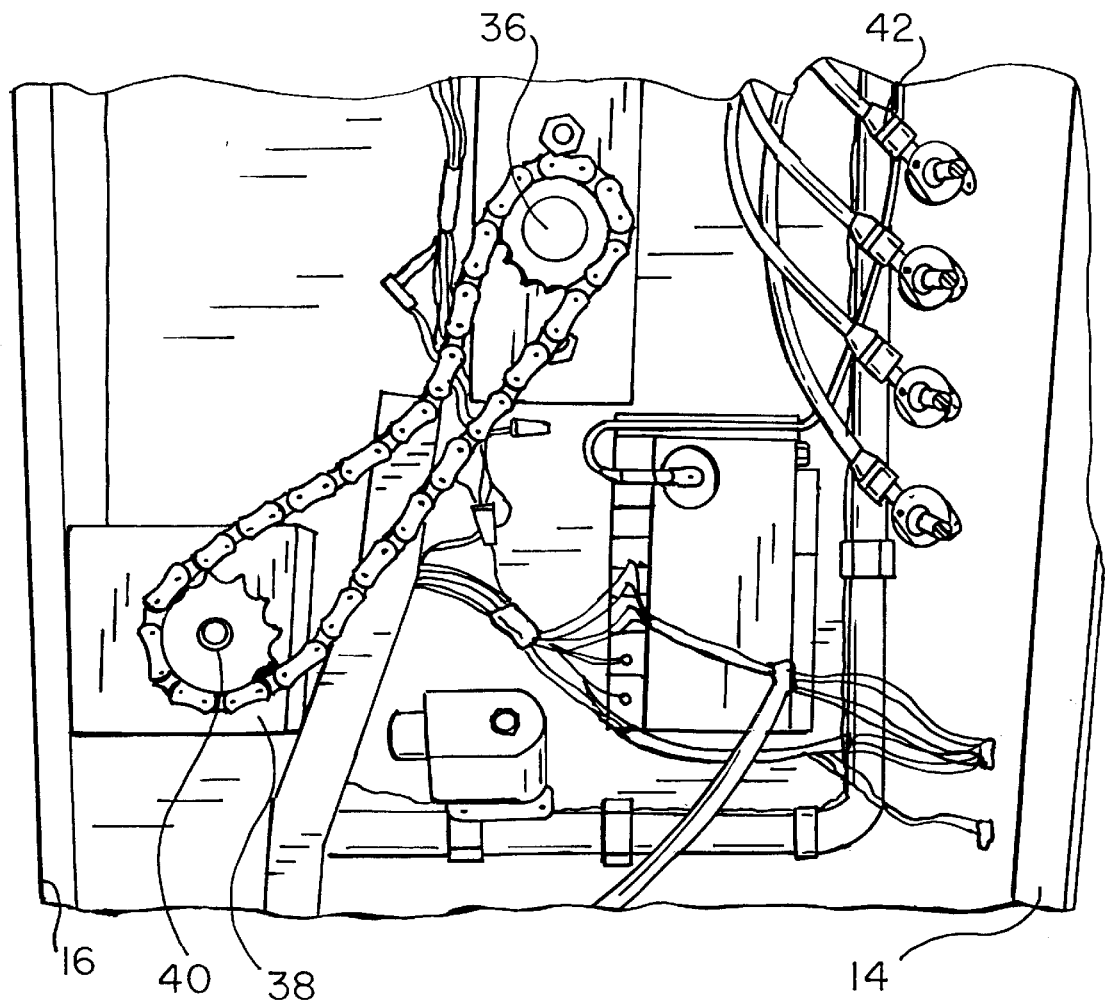
FIG. 2 is a side plan view of the system motor and the hydrocarbon gas inputs to the infrared burners of the system.
Figure 4:
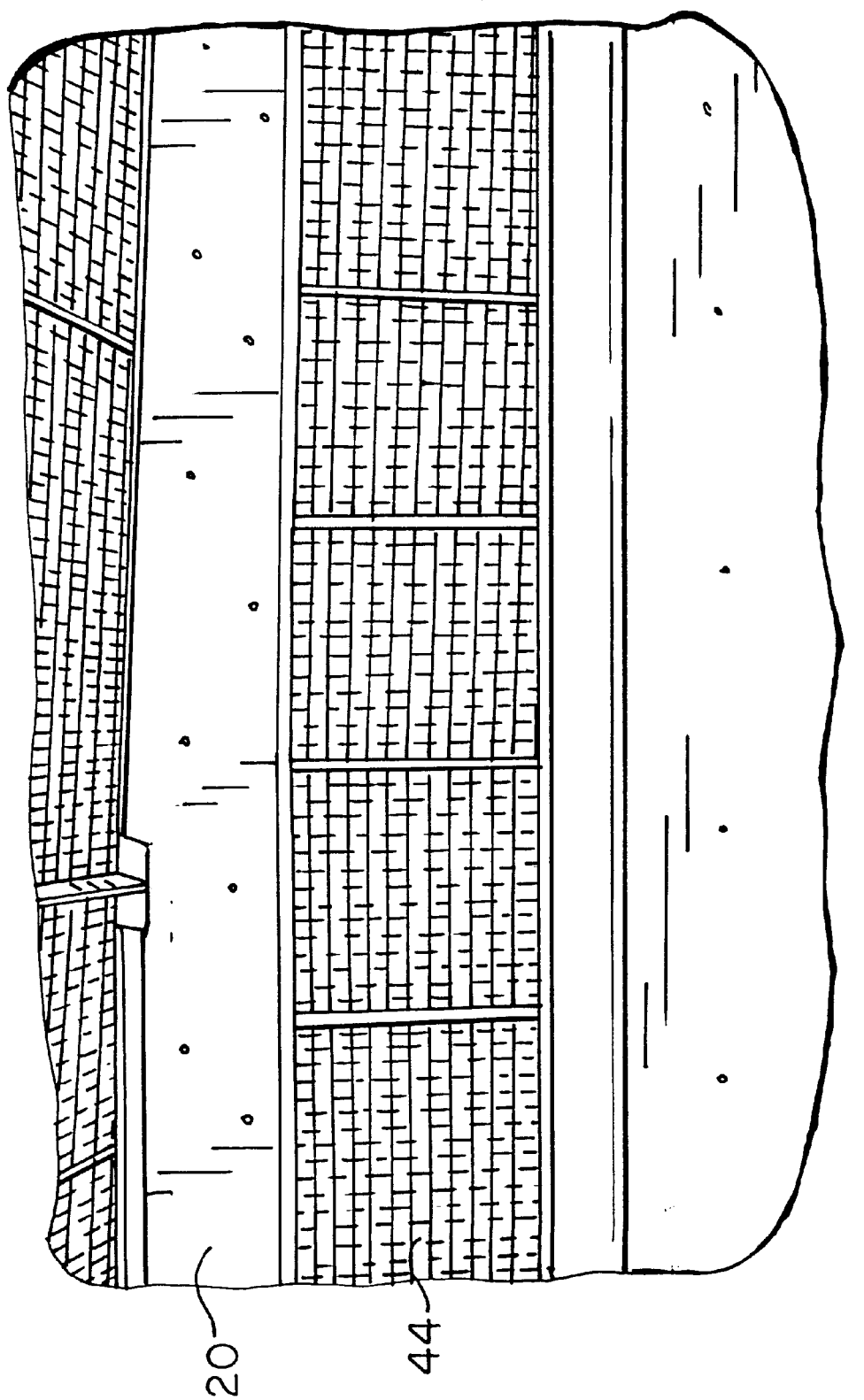
FIG. 4 is a top internal view showing the infrared elements relative to the curved upper roof of the oven.

Said axles 28 of food holding wire baskets 26 are secured to journal receiving means 33 of end plates 34 (see FIG. 3) which are rigidly secured to a system axle 36 which is journaled within said left and right end walls 22 and 23. Said system axle is powered by a 0.02 horsepower gear motor 38 which is shown in FIG. 2. That is, through a conventional gear and sprocket arrangement, rotational gear output 40 of motor 38 provides rotational input to said system axle 36. Further shown in FIG. 2 are natural or synthetic gas inputs 42 to overhead infrared radiant elements 44 within said upper concave surface 20 of the system housing 12. See FIGS. 3 and 4. As may be more particularly appreciated with reference to FIG. 6, said infrared radiation elements 44 are preferably directed toward wire mesh baskets 26 such that the nearest point of approach thereof to said baskets is approximately five centimeters. Therein, it is further noted that the radius of rotation of basket axles 28 relative to system axle 36 is in a range of about five to about nine centimeters. It has been found that the vertical width of said elongate opening 32 is advantageously about 50% of said radius of rotation of said baskets. Also, the axis of this opening need not be horizontal.

The output of said infrared elements is sufficient to produce a temperature of at least 1,000 degrees centigrade at a distance of about eight centimeters therefrom, that is, at the point of closest approach of sidewalls of said wire mesh baskets 26 to said elements.

It has been found that optimal results are achieved if the interior envelope of the housing is provided with a light reflective surface in order to thereby maximize reflective radiant energy throughout the interior envelope. Further, a rate of rotation of end plates 34 and thereby, of all baskets 26, relative to system axle 36, in a range of six to ten rpm is optimal for obtaining the desired balance between (1) direct radiant roasting when the food, preferably, chicken wings or meat, is at its uppermost level relative to the infrared elements and (2) ambient convective cooking throughout the interior envelope when the basket is at other rotational positions therewithin. It is to be appreciated that such ambient convective cooking plays a significant role in achieving the advantageous and novel culinary result of the present system in that, given the substantially closed nature of the present housing (this excepting said elongate atmospheric opening 32), BTUs in the range of 80,000 per hour exist within the housing interior, thereby providing substantial ambient convective cooking when the food within a given basket is not in its uppermost rotational position. Therein, it has been found that infrared radiant energy is primarily responsible for deep cooking of meat and food, while convective heating, and the high temperature associated therewith, is responsible for surface roasting and singing of the food. This combination of deep cooking and radiant roasting effected when the food is in nearest proximity to infrared burners 44, in combination with the above-discussed tumbling of the food within basket 26 and elongate atmospheric opening 32 of the oven, provide a unique synergy, the result of which is that meat or food within said basket is quickly, typically within three minutes, cooked to a high degree of tenderness without loss of flavor or moisture, enabling meat to retain its natural flavor and juices. Accordingly, at an upper zone 46 (see FIG. 6) which is within concave region 20 of the housing, there occurs an intensified area of trapped superheated air by a combination of direct infrared radiation and reflected rays caused by a lens effect of the shiny interior surface of the interior floor of the housing. Further, heat generated by burning gas within radiant elements 44 will contribute to the above noted high level of BTUs and temperature within the interior of the housing. Accordingly, the burning gas furnished by gas inputs 42 (see FIG. 2) operate both to produce infrared radiation from elements 44 and to generate considerable heat which is uniformly distributed within the housing interior through the operation of fan means 48. (see FIG. 6).

There is a stainless steel drip pan which is heated by the gas burners to extreme temperatures that dripping juice and fats are immediately vaporized turning to smoke which flavors the meat, as if cooked on an open chargrill, without causing the flare-ups which dry the meats as in bottom fired grills.

At the bottom of the oven 10 is provided a grease tray 50 (see FIGS. 3 and 6) which catch juices, grease, and the like that may be drip from the rotating food during the cooking process. Tray 50 may be readily removed and cleaned between operations of the system.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

Having thus described my invention, what I claim as new, useful and non-obvious and, accordingly secure by Letters Patent of the United States is:

1. A roasting oven system, comprising:

(a) a plurality of elongate food-holding wire mesh baskets, each having an axis of rotation defined by left and right axle means secured to left and right end walls of said baskets;

(b) a housing having respective upper, lower, front, back, left end, and right end walls, said walls defining, in combination, a hollow interior envelope having a substantially concave upper surface thereof, said housing including, within at least one of said front or rear wall thereof, a movable panel for selectably removing and inserting said elongate baskets into said housing and upon journal means within end plates at each opposite end wall of said housing, at least one of said front or rear walls further including a narrow elongate opening to thereby provide a continuous and uninterrupted communication between said hollow interior envelope and the atmosphere;

(c) at least one elongate infrared radiation element situated within said envelope of said oven housing, said element comprising means for transmitting infrared radiation into said interior envelope of said housing, said radiation directed generally toward a center of the housing envelope preferably located in the concave upper surface of the housing;

(d) a system axle journalled between said housing end walls, and located proximally to said center of said housing and also positioned between one and two basket diameters from said infrared radiation element, said axle rigidly secured to said end plate; and (e) drive means coupled to said system axle for effecting rotational movement of said end plates and said baskets journalled therein, said drive means comprising means for passing food products within said baskets through an arc of rotation and thereby into a zone of intensified temperature generally defined by said substantially concave upper surface of said roasting over system.

2. The system as recited in claim 1, in which said hollow interior envelope of said housing comprises a light reflective surface.

3. The system as recited in claim 2, in which a rate of rotation of said system axle by said drive means comprises:

a range of six to about ten rpm.

4. The system as recited in claim 1, in which an output of said infrared radiation element comprises:

means for producing a temperature of at least 1,000 degree C at a distance of about 8 cm therefrom.

5. The system as recited in claim 4, in which said system axle comprises means for providing a nearest rotational approach of an outer sidewall of each basket to said infrared element of about eight to ten centimeters.

6. The system as recited in claim 1, in which a radius of said wire mesh baskets is in a range of four to six centimeters.

7. The system as recited in claim 1, in which a radius of rotation of said basket axles relative to said system axle comprise:

a range of about five to about nine centimeters.

8. The system as recited in claim 1 in which a radius of curvature of said concave upper surface comprises:

a range of about eight to about twelve centimeters.

9. The system as recited in claim 1, further comprising:

means for internal circulation of heated air within said interior envelope of the housing.

10. The system as recited in claim 1, in which said at least one infrared radiation element comprises:

a gas inlet in at least one segment of a burner body having openings in said burner body for ejecting streams of gas to mix with air for combustion of a gas-air mixture therein.

11. The system as recited in claim 7, in which a height of said elongate opening of said front or rear wall comprises about 50% of said radius of rotation of said basket axles.

\* \* \* \* \*